April 11, 1967 R. C. SPRAGG 3,313,149

APPARATUS FOR INVESTIGATING SURFACE TEXTURE

Filed June 22, 1964 5 Sheets-Sheet 1

Inventor
ROBERT C. SPRAGG
By Holcombe, Wetherill & Brisebois
Attorneys

Inventor
Robert C. Spragg
By
Holcombe Wetherill & Brisebois
Attorneys

April 11, 1967 R. C. SPRAGG 3,313,149

APPARATUS FOR INVESTIGATING SURFACE TEXTURE

Filed June 22, 1964

5 Sheets-Sheet 3

Inventor
ROBERT C. SPRAGG
By
Holcombe, Wetherill & Brisebois
Attorneys

Inventor
Robert C. Spragg
By
Holcombe, Wetherill & Brisebois
Attorneys

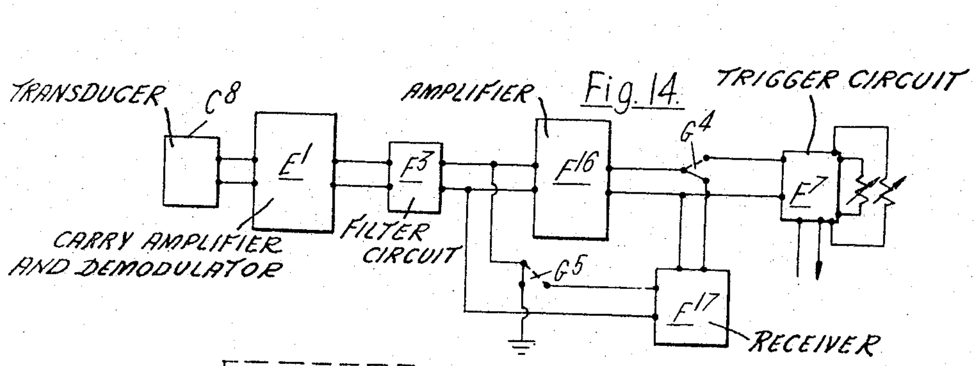
Fig. 14.
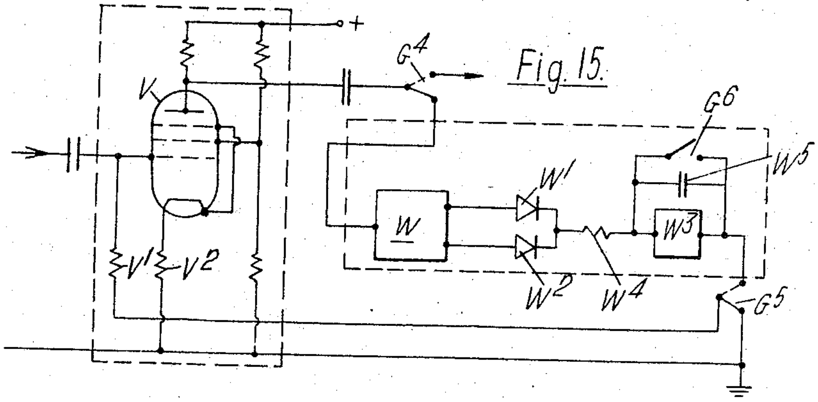
Fig. 15.
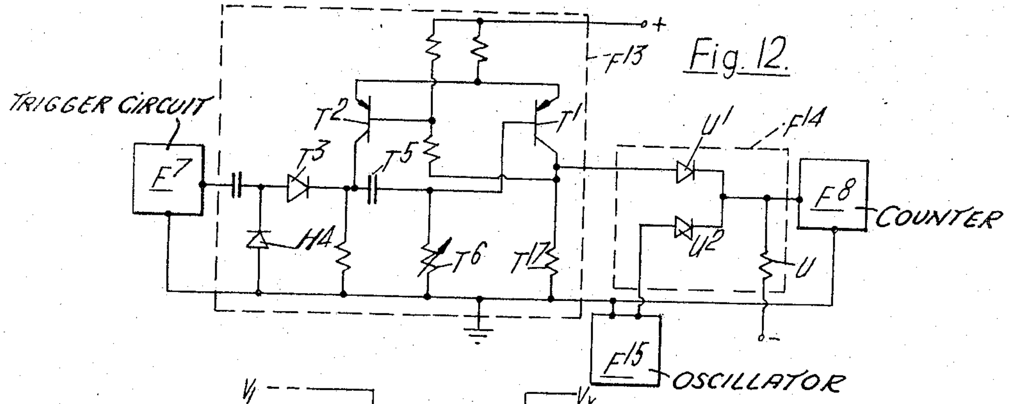
Fig. 12.
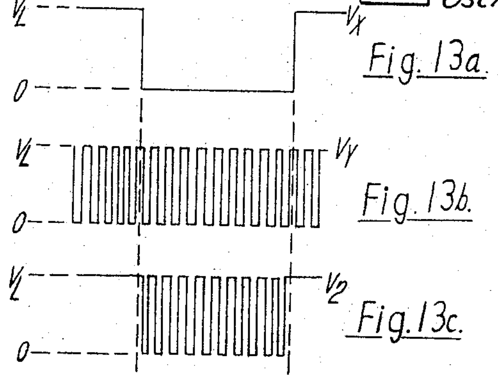
Fig. 13a.
Fig. 13b.
Fig. 13c.
Inventor
Robert C. Spragg
By
Holcombe, Wetherill & Brisebois
Attorneys United States Patent Office 3,313,149

Patented Apr. 11, 1967

3,313,149

APPARATUS FOR INVESTIGATING SURFACE TEXTURE

Robert Claude Spragg, Leicester, England, assignor to Rank Precision Industries Limited, trading as The Rank Organisation Rank Taylor Hobson Division, Leicester, England, a company of Great Britain Filed June 22, 1964, Ser. No. 376,938
Claims priority, application Great Britain, June 26, 1963, 25,407/63; June 11, 1964, 24,269/64
28 Claims. (Cl. 73—105)

Figure 1:
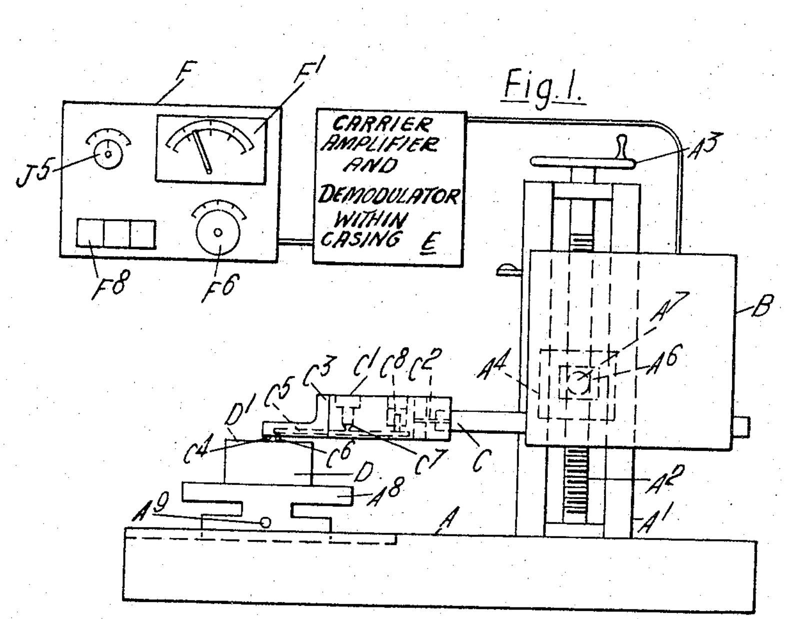

This invention relates to apparatus for investigating surface texture having a stylus for engagement with the surface under test, means for traversing the stylus across the test surface and means for generating electrical signals representative of the working movements of the stylus approximately normal to the test surface during traversing and more particularly to means in such apparatus for the investigation of surface high spots or valleys.

In such surface investigating apparatus, it is known to provide means for the investigation of surface high spots or valleys in the form of means for measuring the bearing area of the test surface at various absolute depths below the height of the highest peak, regardless of the actual value of such height. For practical purposes it is more usually desirable to determine the bearing area at levels which are proportionately related to the value of a characteristic magnitude of the profile of the test surface, whether this characteristic magnitude is the height of the highest peak or some other parameter of such surface profile and whether or not the value of this characteristic magnitude or other parameter is absolutely known. A disadvantage of the known apparatus is that the determination of the bearing area at such levels requires the height of the highest peak first to be measured and then calculations to be made involving the value determined by such measurement.

An object of the invention is to provide, in surface investigating apparatus, improved means for the investigation of surface high spots or valleys, for example to provide a count of high spots or valleys or to provide a measure of bearing area or to provide both such high spot or valley count and such bearing area measurement. In this connection it is to be appreciated that it is important to obtain a measurement or indication of the surface high spots or valleys, not only at the time the test is carried out, but a measurement or indication of the surface high spots or valleys which will exist when the test surface has subsequently been further prepared, for example by grinding or polishing, or has subsequently been subjected to wear. For this purpose it is desirable to be able to effect the measurement or indication of surface peaks and valleys at a number of levels, and the improved apparatus according to the present invention enables such measurement or indication to be directly obtained at levels proportionately related to the value of a characteristic magnitude of the test surface, and to be obtained with a high degree of accuracy.

In the surface investigating apparatus according to the invention means are provided for the investigation of surface high spots or valleys comprising means for receiving the amplified profile-representative signals during a preliminary traversing movement of the stylus, an adjustable gain device which is operated, in preparation for a second traversing movement of the stylus along the test surface, in accordance with the value of a characteristic magnitude of the amplified profile-representative signals fed to the receiving means during the preliminary traversing movement, so that the profile-representatative signals generated during such second traversing movement are amplified at a gain such that the value of the said characteristic magnitude corresponds to a pre-selected value, a trigger circuit for receiving the amplified profile-representative signals at the adjusted gain during the second traversing movement of the stylus, means for adjusting the level at which the trigger circuit is actuated, whereby only selected of the amplified profile-representative signals give rise to output pulses from the trigger circuit, and means fed with the output pulses of the trigger circuit for providing a measurement or indication relating to surface high spots or valleys in accordance with the setting of the level-actuating adjusting means.

Thus, with this arrangement, the measurement or indication is obtained relative to a reference afforded by the setting of the actuating-level adjusting means, which reference can be pre-selected at will in known relationship to the value of the characteristic magnitude of the profile-representative signals to which the receiving means is responsive during the preliminary traversing movement. Thus, the level-actuating adjusting means preferably incorporates a scale calibrated in terms of the said characteristic magnitude. Furthermore, although the actual value of such characteristic magnitude of the profile-representative signals varies appreciably from one test surface to another, depending on the nature and degree of roughness thereof, the setting of the actuating-level adjusting means properly provides the chosen reference in each case since the adjustable gain device is correctly adjusted so that the value of such characteristic magnitude in the amplified profile-representative signals arising due to the second traversing movement corresponds to the pre-selected value. For example, the receiving means may conveniently include an integrating circuit providing an output indicative of a mean or average value of the amplified profile-representative signals fed to such receiving means during the preliminary traversing movement, whereby by adjustment of the adjustable gain device, the mean or average value of the amplified profile-representative signals fed to the trigger circuit during the second traversing movement of the stylus is caused to correspond to the preselected value. In general, it is preferred to utilise a mean or average value of the profile-representative signals as the characteristic magnitude on which is based the gain adjustment, primarily because such a mean or average value will usually be found to be substantially the same wherever traversing is effected along the test surface, whilst some other parameters, and particularly the height of the highest peak, may vary considerably from one test to another on the same surface according to the chance of whether or not an especially high peak happens to lie in the path of the stylus.

In one convenient arrangement, the means for receiving the profile-representative signals during the preliminary traversing movement of the stylus provides an output representing the centre line average of such signals and thus of the profile of the test surface. In this instance the actuating-level adjusting means for the trigger circuit may be adjustable, and is preferably calibrated for such purpose, say in multiples of the centre line average above and below the mean signal value (usually zero). Thus, if for example such actuating-level adjusting means is set to the level of the centre line average above such mean value, then the only amplified profile-representative signals which actuate the trigger circuit during the second traversing movement of the stylus are those whose amplitudes exceed such value, representing relatively high peaks on the surface under test. On the other hand, if the actuating-level adjusting means is set to the level of the centre line average below such mean value, then during the second traversing movement of the stylus the trigger circuit will be actuated only by the amplified profile-representative signals whose amplitudes fall below such value, which signals represent relatively deep valleys on the surface under test.

It will also be appreciated that a further advantage of the above-described apparatus is that the trigger circuit always receives for measurement purposes profile-representative signals wherein the characteristic magnitude has been adjusted to the same value, which is conducive to accuracy.

The receiving means may act to effect adjustment of the adjustable gain device automatically in accordance with the value of the characteristic magnitude of the amplified profile-representative signals fed to such receiving means during the preliminary traversing movement of the stylus, but alternatively the adjustable gain device may be operable manually.

Preferably, in the last-mentioned case, the receiving means is constituted by an electrical meter affording an indication of the value of the characteristic magnitude of the amplified profile-representative signals fed to such receiving means during the preliminary traversing movement of the stylus, and the adjustable gain device is operable by means of a hand control associated with a scale calibrated in terms of a corresponding scale on such meter. With this arrangement, the actual value of the meter characteristic corresponding to the pre-selected particular scale value of such meter, for example the centre line average value in the case of an integrating meter, in terms of which the adjustable gain device may be calibrated, is not important. In practice however, the value at full scale deflection may conveniently constitute such pre-selected particular value. Thus, in this instance, the meter may conveniently have a supplementary scale which enables to be observed the proportion of full scale deflection with occurs due to the preliminary traversing movement of the stylus, and the adjustable gain device may be correspondingly calibrated in terms of proportions from 0 to 1 (or 0 percent to 100 percent), so that before the repeat traversing movement of the stylus, the adjustable gain device is set to the same proportion value as that proportion value observed on the supplementary scale of the meter due to the preliminary traversing movement of the stylus. Thus, it is not essential for the meter actually to give a measurement of the value of the characteristic magnitude arising due to the preliminary traversing movement of the stylus.

In one arrangement in which the gain adjustment is effected automatically, the adjustable gain device comprises a variable gain amplifying circuit having a control point at which variation in a control potential causes the required gain adjustment, the control potential at such control point during the second traversing movement of the stylus being determined by the value of the characteristic magnitude of the profile-representative signals fed to the receiving means during the preliminary traversing movement of the stylus. For example, such circuit may include a variable-mu valve having a control grid constituting the control point of the circuit. With such automatic variable gain circuit, the receiving means preferably comprises means for storing an electrical charge representing the value of the characteristic magnitude of the profile-representative signals fed to such receiving means during the preliminary traversing movement of the stylus, the potential created by such charge being applied to the control point of the variable gain amplifying circuit to cause the profile-representative signals generated during the second traversing movement of the stylus to be amplified at the required gain. Such charge storage means may for example be constituted in part by the integrating circuit previously mentioned whereby the gain adjustment is effected in accordance with a mean or average value of the amplified profile-representative signals fed to the receiving means during the preliminary traversing movement of the stylus.

With manual adjustment especially, the adjustable gain device may conveniently comprise an amplifier having a feedback circuit incorporating a variable impedance. This amplifier may also be operative during the preliminary traversing movement of the stylus. For example, in one arrangement, the amplifier has a feed-back circuit in two parts, the first part being of fixed impedance and being operative during the preliminary traversing movement of the stylus and the second part being of variable impedance and being rendered operative by a switching device only during the second traversing movement of the stylus.

It must be emphasized that it is essential for the adjustable gain device to be operated, in the manner above described, to effect amplification at the required gain during the second traversing movement of the stylus, so that if then fed to the receiving means the amplified profile representative signals at adjusted gain would give rise to an output corresponding to the pre-selected particular value. If this adjustment of the gain is not effected, the setting of the actuating-level adjusting means does not afford the desired reference relative to which measurement or indication is effected during the second traversing movement of the stylus.

By adjustment of the actuating level of the trigger circuit, a measurement or indication can be obtained of the high spots or valleys of the test surface which will exist after further preparation or after wear of such surface.

The trigger circuit may conveniently comprise a Schmitt trigger employing two valves with a common cathode load, the amplified profile-representative signals at the adjusted gain being fed to the control grid of the first valve, which is biassed at a level determined by the actuating-level adjusting means so as normally to be in one of two opposite states of conductivity, and the pulse output of the first valve being taken from the anode to the control grid of the second valve, which is biassed so as normally to be in the state of conductivity opposite to the normal state of conductivity of the first valve, thereby to give rise to output pulses of substantially square waveform at the anode of such second valve. Alternatively, a corresponding transistor Schmitt trigger may constitute such trigger circuit. In the latter case, such Schmitt trigger employs two transistors with a common emitter load, the amplified profile-representative signals at the adjusted gain being fed to the base of the first transistor which is biassed at a level determined by the actuating-level adjusting means so as normally to be in one of two opposite states of conductivity, and the pulse output of the first transistor being taken from the collector to the base of the second transistor, which is biassed so as normally to be in the state of conductivity opposite to the normal state of conductivity of the first transistor, thereby to give rise to output pulses of substantially square waveform at the collector of such second transistor.

The backlash voltage of the trigger circuit, that is the difference between the potential at which such circuit is triggered on and the potential at which such circuit is triggered off, may conveniently be arranged, more particularly by suitable selection of the circuit components, to determine the minimum change in amplitude of the selected amplified signals giving rise to output pulses from the trigger circuit. This is useful for example when it is desired to exclude from the measurement or indication any minute surface irregularities which may appear superimposed on the major peaks and troughs of the test surface, and also for the avoidance of errors which might arise due to the presence of very small amplitude signals due to noise in the amplified signals fed to the trigger circuit.

In a practical arrangement, the trigger circuit has associated with it an input circuit of high input impedance and low output impedance and comprsing a valve or transistor biassed on the control grid or base by means of a variable resistance constituting the actuating-level adjusting means, the amplified profile-representative signals at adjusted gain being applied to the control grid of such valve or base of such transistor and the output of such valve or transistor being taken directly to the trigger circuit.

For providing a count of high spots or valleys in accordance with the setting of the level-actuating adjusting means, corresponding to the selected amplified signals actuating the trigger circuit, the output pulses of the trigger circuit are fed to an electrical pulse counter.

For providing a measure of the bearing area of high spots or valleys, the output pulses of the trigger circuit are utilised to operate integrating means providing an output indication of the sum of the widths of the pulses actuating such trigger circuit in accordance with the setting of the actuating-level adjusting means. Such integrating means is preferably fed from a constant-current source through a switching device for a time dependent on the durations of the output pulses of the trigger circuit. The constant-current source may conveniently be pre-adjusted to give a pre-selected output from the integrating means with the switching device transmitting throughout the duration of the second traversing movement of the stylus. In the case where an integrating circuit is used for receiving the amplified profile-representative signals during the preliminary traversing movement of the stylus, such circuit may conveniently also constitute the integrating means for providing the measurement of bearing area during the repeat traversing movement of the stylus. When such circuit is incorporated in an integrating meter, such meter preferably has an auxiliary scale for reading bearing area in terms of a percentage, and the constant-current source is adjusted to provide a current of such magnitude that, if fed to the meter throughout the repeat traversing movement, the indicated value on such auxiliary scale at the meter would be 100 percent. This value of 100 percent bearing area may conveniently correspond to a full-scale deflection of the meter. Thus, this scale may conveniently also constitute the scale for indicating the percentage of full-scale deflection obtained during the preliminary traversing movement of the stylus.

With regard to measuring the bearing area of surface troughs, it should be mentioned that sometimes it is necessary to effect testing by traversing the stylus along an inverse replica of the actual surface to be tested, so that the measured bearing area of the surface troughs on the replica is a true measure of the bearing area of the surface high spots on the original workpiece to be tested.

For some purposes, it is preferred not to include in the count of high spots or valleys pulses of small duration corresponding to very narrow peaks on the test surface. The output pulses of the trigger circuit may conveniently be fed to the pulse counter through a pulse-width discriminator transmitting only those of the output pulses whose duration exceeds a particular minimum value. Such pulse width discriminator is preferably adjustable to permit pre-selection of the minimum width of pulse to be transmitted.

The pulse width discriminator forming the subject of copending United States patent application Ser. No. 376,919 filed June 22, 1964, in the name of F. N. Taylor has been found convenient for use in the present apparatus for the purposes above mentioned. Such pulse width discriminator comprises a switching circuit which in response to an input pulse provides at two output points two pulses of opposite polarity each of width equal to that of the input pulse, a monostable circuit having an unstable condition into which such circuit can be triggered and incorporating a time delay whereby the unstable condition is maintained for a predetermined period after triggering before the circuit naturally reverts to its stable condition, thereby to provide at an output point of such circuit a pulse of predetermined width, an output gate circuit having two input points so as to be responsive to two input signals of predetermined polarities and providing an output pulse when the level of one input signal remains unchanged longer than the other, a connection whereby the gate circuit is fed with the pulse of predetermined width from the monostable circuit and an output pulse from the switching circuit, a gating circuit whereby the monostable circuit is triggered into its unstable condition by the leading edge of the output pulse of one polarity from the switching circuit, and a second gating circuit whereby the trailing edge of the output pulse of opposite polarity from the switching circuit acts to cause the monostable circuit to revert prematurely to its stable condition when the duration of such output pulse is shorter than the time delay of such monostable circuit, whereby the output gate circuit provides an output pulse only when the input pulse to the switching circuit is of duration exceeding the time delay of the monostable circuit. In this arrangement the time delay of the monostable circuit may conveniently be adjustable to permit the pre-selection of the minimum width of pulse to be transmitted.

It should also be mentioned that the apparatus may conveniently include means for automatically effecting the two traversing movements of the stylus, each along the same path along the test surface, including means for returning the stylus to its starting position after completion of the preliminary traversing movement.

Figure 2:
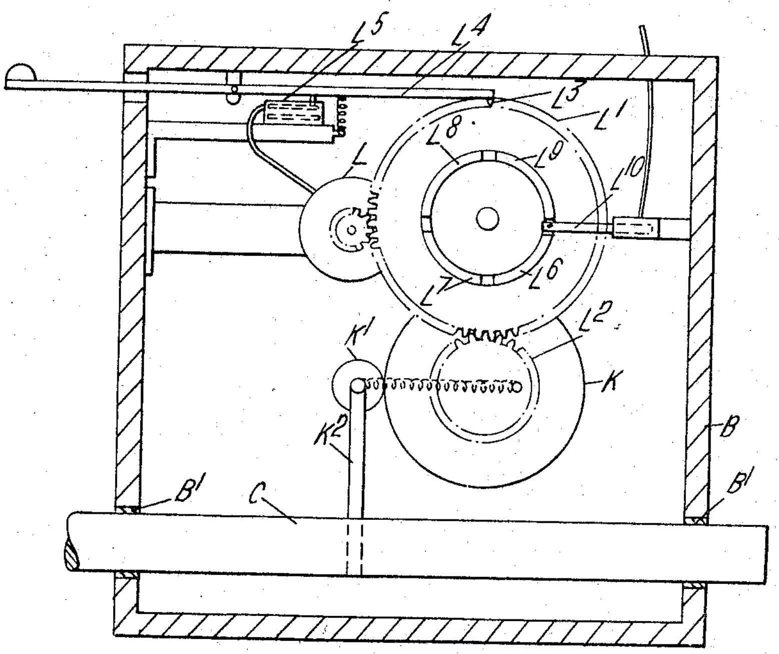
Figure 3:
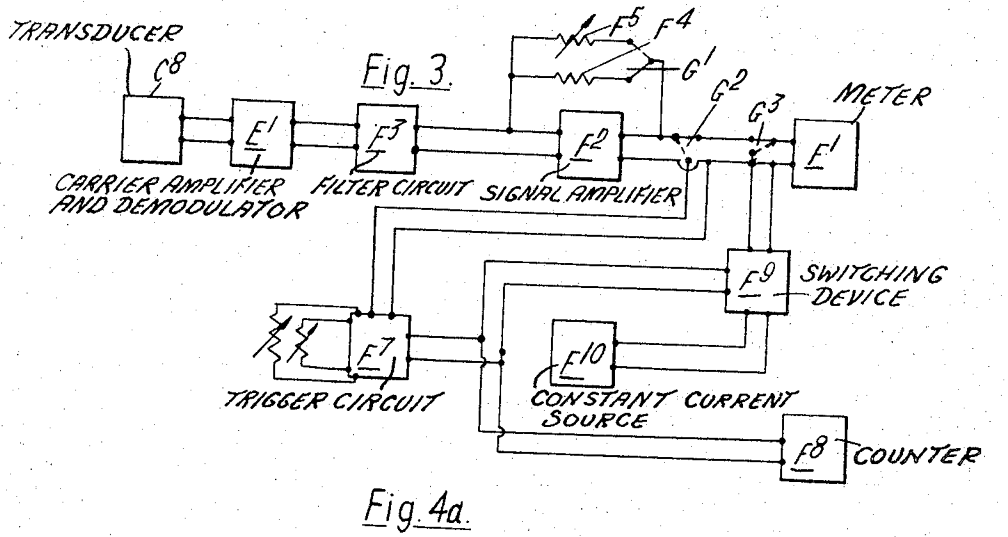
Figures 4A, 4B, 4C:
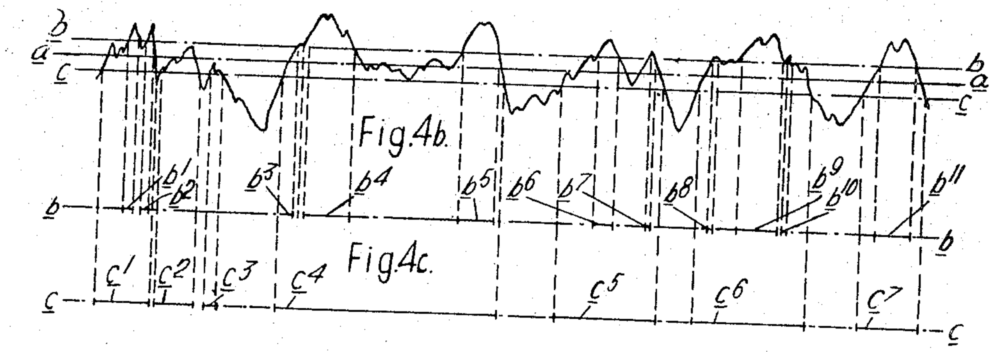
Figure 5:
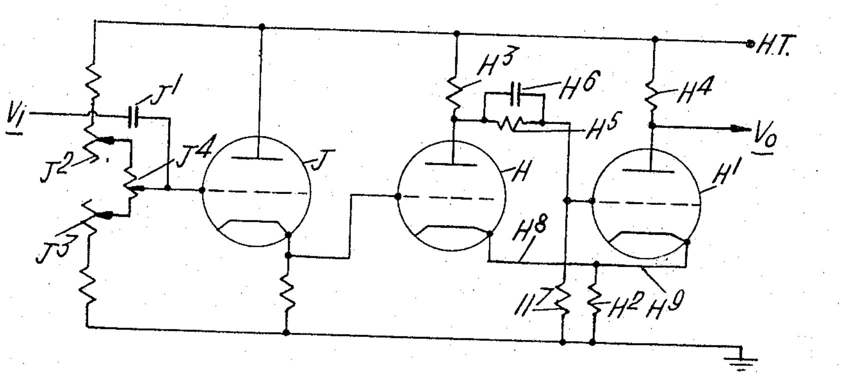
Figure 8:
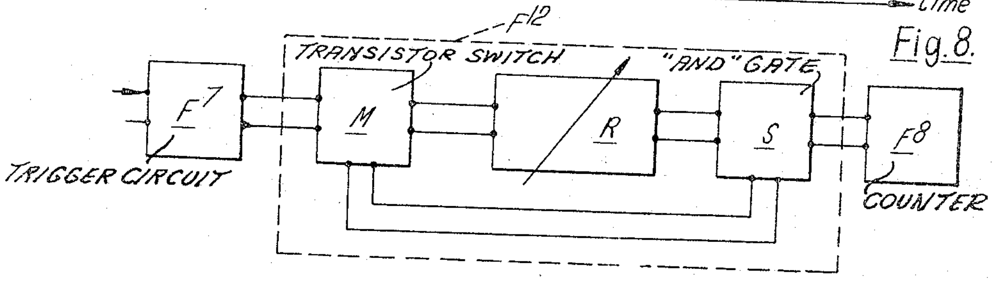
Figures 7, 9, 10A, 10B, 10C, 11A, 11B, 11C:
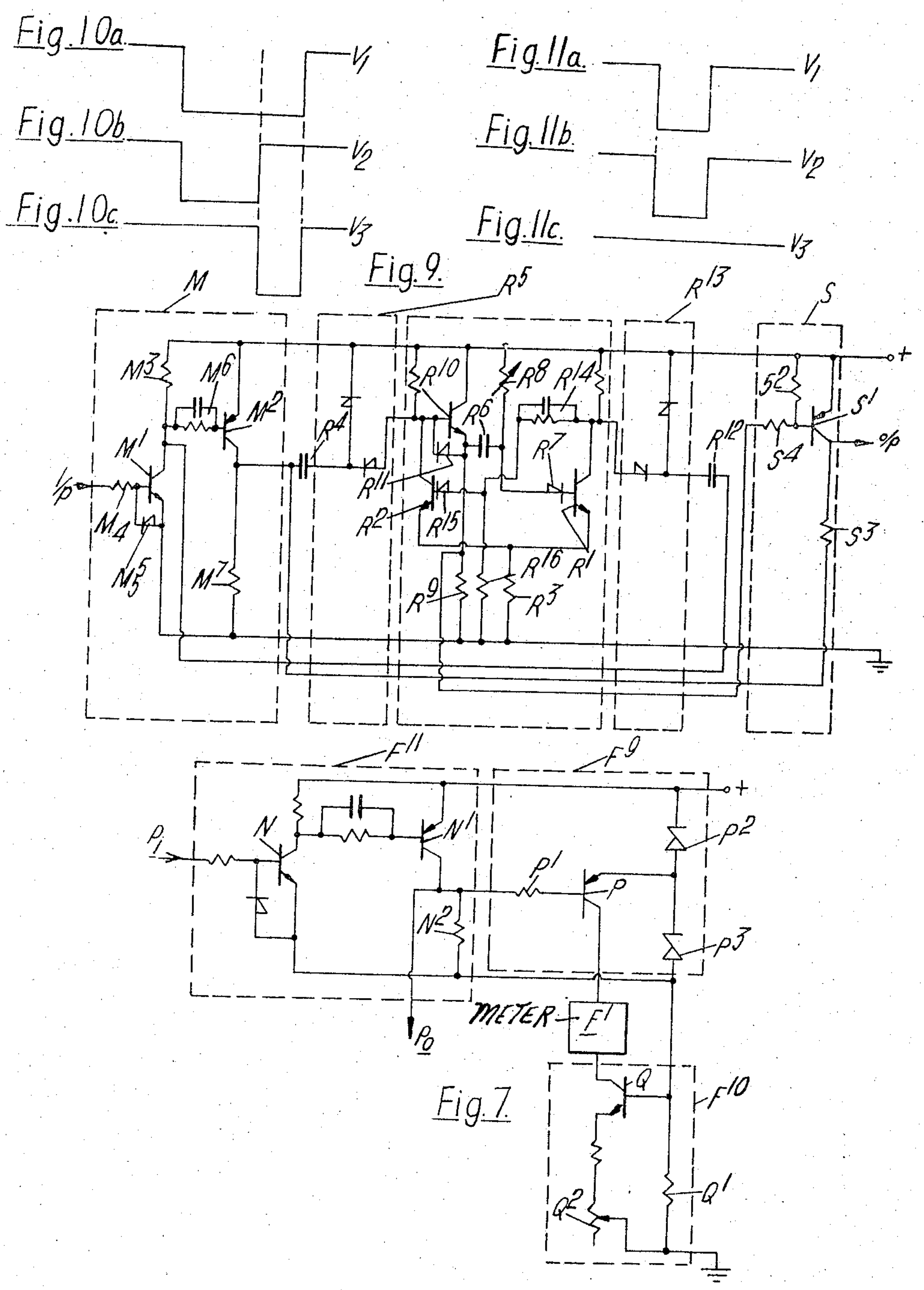

The invention may be carried into practice in various ways but a preferred practical arrangement of apparatus for investigating surface texture according thereto will now be described by way of example with reference to the accompanying drawings in which FIGURE 1 is a view in side elevation of the preferred arrangement of apparatus for traversing a stylus across a test surface and producing profile-representative signals in accordance with the working movements of the stylus during traversing, FIGURE 2 is an enlarged view of the means for effecting traversing of the stylus, FIGURE 3 is a block diagram of the electrical equipment for receiving the profile-representative signals, FIGURE 4*a*, 4*b* and 4*c* illustrate the measurements to be effected by the electrical equipment, FIGURE 5 is a circuit diagram of one unit of the electrical equipment, FIGURE 6*a*, 6*b* and 6*c* ilustrate the waveform associated with the electrical unit of FIGURE 5, FIGURE 7 is a circuit diagram incorporating two further units of the electrical equipment, FIGURE 8 is a block diagram of electrical means for optional use in the electrical equipment, FIGURE 9 is a circuit diagram of the electrical means of FIGURE 8, FIGURES 10*a*, 10*b* and 10*c* and FIGURES 11*a*, 11*b* and 11*c* respectively illustrate alternative sets of waveforms associated with the electrical means of FIGURES 8 and 9, FIGURE 12 is a circuit diagram of further electrical means for optional use in the electrical equipment, FIGURES 13*a*, 13*b* and 13*c* illustrate the waveforms associated with the electrical means of FIGURE 12, FIGURE 14 is a block diagram showing a modification of the electrical equipment, and FIGURE 15 is a circuit diagram of one unit of the modified electrical equipment.

In the preferred arrangement shown in FIGURE 1, the main parts of the apparatus are carried by a casing B mounted for vertical adjustment on a column $A^1$ by means of a vertical screwthreaded shaft $A^2$ rotatable by a handwheel $A^3$. The casing B is for preference detachably mounted on a fitting on a support plate $A^4$ fixed to an internally screwthreaded collar $A^6$ cooperating with the shaft $A^2$, the plate $A^4$ bearing against the column $A^1$ so as to be held against rotation relatively to such shaft. A clamping screw $A^7$ is provided for clamping the collar $A^6$, and thus the support plate $A^4$ and casing B, in the chosen position of vertical adjustment. The column $A^1$ is upstanding from a table A which forwardly of the column constitutes a workpiece support, a workpiece carrier $A^8$ being movably mounted on such table and being provided with a locking element $A^9$ by means of which such carrier can be locked in a chosen position on the table in front of the casing B.

As shown in FIGURE 2, a generally horizontal shaft C is mounted for traversing purposes to slide axially in bearings $B^1$ in the front and rear walls of the casing B. A forwardly extending light-weight pick-up head $C^1$ is pivoted by means of a ligament hinge $C^2$ to the front end of such shaft. A nose $C^3$ is provided on the front end of the pick-up head $C^1$ to carry a downwardly projecting skid $C^4$ with a rounded tip for engagement with the test surface $D^1$ of the workpiece D on the workpiece carrier $A^8$, such skid being urged into engagement with such test surface with a suitable light pressure by the weight of the pick-up head acting about the ligament hinge $C^2$. The nose $C^3$ on the pick-up head $C^1$ is made hollow to accommodate a stylus supporting arm $C^5$ carrying a downwardly projecting stylus $C^6$ with a sharp tip for engagement with the test surface $D^1$ just to the rear of the skid $C^4$. The stylus supporting arm $C^5$ extends rearwardly into the pick-up head $C^1$ and at an intermediate point $C^7$ in its length is pivoted relatively to such pick-up head about a transverse horizontal axis, thereby to permit the stylus $C^6$ to execute working movements during traversing in a direction generally normal to the test surface $D^1$ in accordance with the roughnesses and undulations thereof. The generally vertical movements of the rear end of the stylus supporting arm $C^5$ during traversing effect operation of a detector device, conveniently an electromagnetic transducer $C^8$ having one part secured to the stylus-supporting arm and one part secured to the pick-up head $C^1$. The transducer $C^8$ generates electrical signals representative of the working movements of the stylus $C^6$ relative to a datum constituted by the path of movement of the skid $C^4$. The profile-representative signals generated by the transducer $C^8$ during traversing are fed through a carrier amplifier and demodulator, housed within the casing E shown in FIGURE 1, to a signal amplifier and thence to a meter $F^1$, both housed with other electrical apparatus in the casing F shown in FIGURE 1, the meter conveniently being an integrating meter whose deflection provides a measure of an average or mean value, conveniently the centre line average, of the electrical signals. This deflection thereby also provides a measure of the centre line average of the profile of the surface $D^1$ under test over the range of the traversing movement.

The basic units for dealing with the profile-representative signals from the transducer $C^8$ are shown in FIGURE 3, wherein the carrier amplifier and demodulator are indicated at $E^1$ and the signal amplifier at $F^2$. Owing to the initial setting of the skid $C^4$ and stylus $C^6$ relative to the test surface $D^1$, as determined by the position of adjustment of the casing B on the column $A^1$, the profile-representative signals fed from the demodulator will usually include a D.C. term. Such signals will also usually include A.C. terms of lower order frequencies representative of the shape of the test surface $D^1$ rather than the texture of such surface. Before the profile-representative signals are fed to the signal amplifier $F^2$ such signals are modified in that any D.C. term and any A.C. terms of frequency below a predetermined value are extracted by means of a filter circuit $F^3$, also housed within the casing F, which additionally houses a phase inverting circuit (not shown).

Means are also provided in this preferred arrangement for counting the high spots or valleys and measuring the bearing area of the test surface $D^1$ over the range of the traversing movement. For this purpose the traversing movement of the skid $C^4$ and stylus $C^6$ is repeated over the same range along the test surface $D^1$, means being provided for returning the pick-up head $C^1$ to its starting position at the end of the first or preliminary traversing movement and for effecting the second or repeat traversing movement, as later described.

The measurements which it is desired to effect will now be explained for clarity with reference to FIGURES 4*a*, 4*b* and 4*c*. FIGURE 4*a* represents the profile of a typical test surface D1, the level *a—a* on such profile being the mean surface level. It will usually be desirable to determine the bearing area and high spot count of the surface at various levels, which may or may not include the mean line level *a—a*, in order to know what the bearing area and high spot count of the surface will be when the surface has been subject to wear or has been further prepared. Two possible levels at which it may be desired to effect measurement are indicated in FIGURE 4*a* by the levels *b—b* and *c—c*, say for example the centre line average value above the mean line *a—a* and the centre line average value below such mean line *a—a* respectively, the centre line average value having been determined by the preliminary traversing movement of the stylus $C^6$. FIGURE 4*b* shows the bearing area and high spot count at the level *b—b*, the bearing area being determined by the proportion of the surface, preferably throughout the range of traverse, which lies above the level *b—b* and the high spot count being determined by the number of times the profile rises above the level *b—b*. Thus, FIGURE 4*b* shows that the bearing area at the level *b—b* of the surface is the sum of the lengths $b^1$, $b^2$, $b^3$ . . . $b^{11}$, divided by the length of the range of traverse, clearly resulting in a bearing area measurement appreciably less than 50 percent. Similarly, the high spot count at the level *b—b* is seen to be eleven. FIGURE 4*c* shows the bearing area and high spot count at the level *c—c*, the bearing area being the proportionate sum of the lengths $c^1$, $c^2$, $c^3$ . . . $c^7$, clearly resulting in a bearing area measurement greatly exceeding 50 percent, whilst the high spot count, which may alternately be regarded as the valley count, is seen to be seven.

During the preliminary traversing movement, the gain of the signal amplifier $F^2$ is determined by a feed-back impedance $F^4$ of fixed value (see FIGURE 3). However, during the repeat traversing movement such fixed impedance is switched out of circuit at $G^1$ and a variable impedance $F^5$ is switched into circuit to determine the gain of the amplifier $F^2$. The control element $F^6$ (see FIGURE 1) for adjusting such variable impedance $F^5$ is associated with a scale calibrated in terms of the full scale value of the integrating meter $F^1$, which is conveniently provided with a supplementary scale which enables the proportion of full scale deflection, which occurs due to the preliminary traversing movement of the stylus $C^6$, to be directly observed. Following the preliminary traversing movement of the stylus, the variable impedance $F^5$ is adjusted by means of such control element $F^6$ so that during the repeat traversing movement of the stylus $C^6$ the amplified profile-representative signals would, if fed to the integrating meter $F^1$, give rise to a full scale deflection. However, during such repeat traversing movement, the meter $F^1$ is disconnected from the amplifier $F^2$ by suitable switching means $G^2$ which in addition serve to connect the amplifier to a trigger circuit $F^7$ during such repeat traversing movement.

This trigger circuit is shown in detail in FIGURE 5 and conveniently comprises a Schmitt trigger consisting of two triode valves H and $H^1$ having a common cathode load resistance $H^2$ and each having an anode load ($H^3$ or $H^4$). The first valve H is associated with an adjustable biassing device, the inverted amplified profile-representative signals at the adjusted gain being fed to its grid through an input circuit which is later described, incorporating such adjustable biassing device. This first valve H, if assumed to be in a non-conducting state at the time, is caused to trigger when the signal potential, together with the potential preselected by the setting of the biassing device, exceeds the minimum potential required to cause such first valve to be conducting. The anode of the first valve H is connected to the grid of the second valve $H^1$ through a coupling circuit consisting of a resistance $H^5$ and capacitance $H^6$ in parallel. Such grid of such second valve $H^1$ also has a connection through a resistance $H^7$ to earth, whereby the anode load $H^3$ of the first valve H, the resistance $H^5$ of the coupling circuit and such grid resistance $H^7$ of the second valve form a potential divider such that the second valve is normally maintained in a state of conductivity opposite to that of the first valve. When the first valve H is triggered on or off, the potential falls or rises on the grid of the second valve $H^1$ and such second valve is triggered off or on.

In such Schmitt trigger circuit, the potential on the grid of the first valve is required to fall to a value, below the potential at which such valve is triggered on, before such valve is triggered off. This is due to the inherent backlash of the circuit, as is well understood in the art. The degree of back-lash is determined by selection of the circuit components.

With the above-described trigger circuit, output pulses of substantially square waveform are taken from the anode of the second valve $H^1$. However, in order for an output pulse to result, the signal arriving at the grid of the first valve H must have a leading edge rising above the triggering on potential from below the triggering off potential and a trailing edge falling from above the triggering on potential to below the triggering off potential.

The trigger input circuit is conveniently of high input impedance and low output impedance, comprising a cathode follower triode valve J to the grid of which the inverted amplified signals are applied, during the repeat traversing movement of the stylus, through an input capacitor $J^1$. The grid bias of the cathode follower valve is determined by a variable potential divider including two ganged variable resistances $J^2$ and $J^3$ in series which determine the potentials at the ends of a potentiometer $J^4$ series connected between such two ganged variable resistances. The movable tapping of the potentiometer $J^4$ is connected directly to the grid of the cathode follower valve J, the two ganged variable resistances $J^2$ and $J^3$ of the potential divider being pre-set so that the potential of the centre point of the potentiometer $J^4$ is equal to the minimum potential required to render conducting the first valve H of the Schmitt circuit. By movement of the tapping of the potentiometer $J^4$ on either side of the centre point to alter the potential on the grid of the cathode follower valve J, the potential is proportionately altered on the grid of the first valve H of the trigger circuit either above or below the minimum potential required to cause such first valve to be conducting.

The tapping of the potentiometer $J^4$ is moved by means of a control element $J^5$ (see FIGURE 1) associated with a scale calibrated in terms of the centre-line average, i.e. the scale characteristic of the integrating meter $F^1$ to which the amplified profile-representative signals are fed during the preliminary traversing movement of the stylus $C^6$. Thus, such scale is conveniently calibrated in multiples of the centre-line average above and below the mean value of the input amplified signals fed to such trigger circuit $F^7$ during the repeat traversing movement of the stylus $C^6$, the central position of the tapping of the potentiometer $J^4$ corresponding to the zero value, i.e. the mean value of the input amplified signals since the D.C. term is extracted, on the scale associated with the control element $J^5$. Notwithstanding the centre-line average reading obtained during the preliminary traversing movement, which clearly varies according to the nature and degree of roughness of the surface under test, the setting of the potentiometer $J^4$ always provides a proper reference, known in terms of such centre-line average, for measurements obtained from the output of the trigger circuit, since during the repeat traversing movement the value of the centre-line average of the input amplified profile-representative signals corresponds to a predetermined value set by the adjustment of the gain of the amplifier $F^2$ to correspond to a full scale deflection of the meter $F^1$.

In use, let it be assumed for example that the biassing potentiometer $J^4$ is set to the centre line average above zero, that is a potential more positive than the minimum potential required to cause such first valve H to be conducting. In this case the first valve H of the trigger circuit is normally conducting and the second valve $H^1$ is normally non-conducting. The first valve H of the trigger will not be switched to a non-conducting state, and the second valve $H^1$ switched to a conducting state, until the potential of the input signals falls to a negative value at least counteracting the positive biassing potential. This will occur with the arrival of an input signal corresponding to a relatively high peak in the surface under test. Subsequently, the states of conductivity of the two valves H and $H^1$ of the trigger circuit will revert to their original state when the potential of the input signals rises to a value which is no longer sufficient to counteract the positive biassing potential. Thus for simplicity assuming that the backlash of the Schmitt trigger is set to zero (which in practice is not possible since conditions of instability arise), the number of output pulses of such trigger circuit, being pulses of substantially square waveform, is representative of the number of times that the potential of the input signals, together with the potential set by the biassing poentiometer $J^4$, i.e. the potential corresponding to the centre line average above zero, has risen and fallen respectively above and below the minimum potential required to cause the first valve H to be conducting. However, it will be realised that the input signals representative of the test surface are of a variety of amplitudes, some such signals corresponding to relatively low surface peaks not as high as the centre line average. With the said setting of the potentiometer $J^4$, input signals due to such relatively low peaks will not give rise to output pulses from the trigger circuit. Thus the number of output pulses from the trigger circuit, during the repeat traversing movement of the stylus, is representative of the number of surface peaks rising above the centre line average above zero. However, it will be appreciated that when the potentiometer is set to apply a negative biassing potential, say the centre line average below zero, then relative to such level a number of surface peaks of varying heights give rise to output pulses only when troughs greater than the centre line average depth below zero occur between any of such peaks. In general therefore, the number of output pulses from the trigger circuit during such repeat traversing movement is representative of the number of surface peaks rising above or the number of surface valleys falling below the scale setting of the biassing potentiometer $J^4$.

Figures 6A, 6B, 6C:
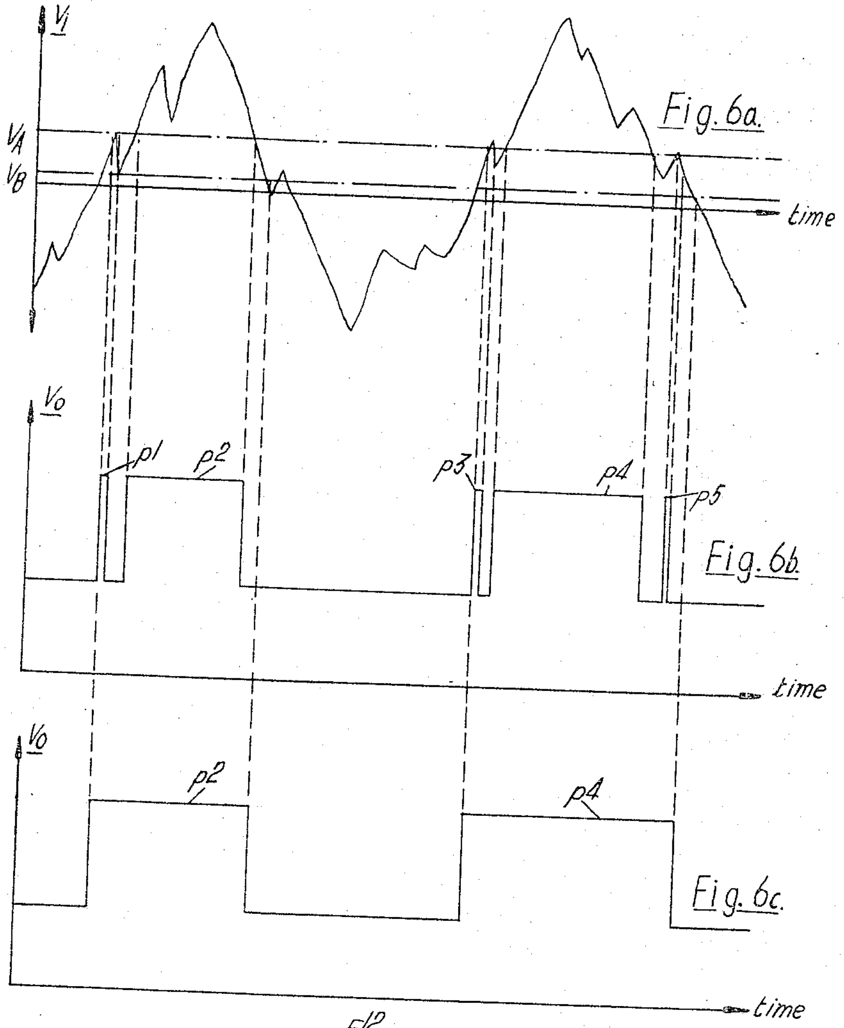

FIGURE 6*a* shows the input signal ($V_1$), i.e. the inverted modified profile-representative signals, to the trigger circuit $F^2$ over a very small portion of the range of traverse, and $V_A$ represents the level, say the centre line average above zero, to which the potentiometer $J^4$ is set by means of the calibrated control element $J^5$. Assuming that the backlash of the Schmitt trigger is set to substantially zero, $V_A$ represents the level in the surface at which such trigger circuit is switched in both directions. In this case the output signal of the trigger circuit is as indicated in FIGURE 6*b*, five pulses $p^1, p^2 \ldots p^5$ being produced for the short portion of the range of traverse in question.

For counting the output pulses of the trigger circuit $F^7$, as selected by the setting of the biassing potentiometer $J^4$, these are conveniently fed to an electrical pulse counter $F^8$ (see FIGURE 3) of conventional design. The reading obtained at such counter $F^8$ at the end of the repeat traversing movement indicates the number of high spots on the test surface $D^1$ relative to the reference defined by the setting of the biassing potentiometer $J^4$, which reference is known in terms of a measured characteristic of the surface, the centre line average value. This is an especially useful measurement for surfaces to be used as bearings, and measurements taken at different settings of the biassing potentiometer $J^4$ in effect provide a count of the high spots not only existing at the time of the test, but also those which will exist when the surface has been further prepared, for example by grinding or polishing, or has been subject to wear. It will also be realised that, with the biassing potentiometer $J^4$ set to apply a negative biassing potential, the count obtained may equally be considered as a measure of the number of troughs throughout the range of traversing. This is also important since in the case of a bearing surface these troughs provide the means by which an oil film is maintained on such surface in use. For any given setting of the biassing potentiometer $J^4$, the number of surface troughs is equal to the number of surface peaks, plus or minus one.

In addition to containing signals due to distinct surface peaks separated by distinct surface troughs, the input signal to the trigger circuit $F^7$ may also contain small amplitude variations due to minute surface irregularities superimposed on the main peaks and troughs. Such minute surface irregularities as occur in the region of the level to which the biassing potentiometer $J^4$ is set may give rise individually to output pulses from the trigger circuit, as is the case with the pulses $p^1$, $p^3$ and $p^5$ in FIGURE 6*b*. It will usually be desired to exclude such minute surface irregularities in the high spot or valley count, and for this reason the Schmitt trigger is preferably arranged to operate with a suitable predetermined back-lash. By virtue of such back-lash, errors in the count due to signal noise arrising from the movement of the pick-up on its guide may also be avoided.

FIGURE 6*c* shows, for the inverted surface profile of FIGURE 6*a*, the effect of setting the backlash of the Schmitt trigger to the value $V_A-V_B$, so that the first valve H of the trigger circuit is rendered conducting when the potential on its grid rises to above the level $V_A$ from below the level $V_B$, and is rendered non-conducting again only when the potential on its grid falls from above the level $V_A$ to below the level $V_B$. This has the effect of eliminating the pulses $p^1$, $p^3$ and $p^5$ from the output of the trigger circuit, so that the high spot count is reduced to two for the portion of the traversing range in question, the remaining pulses $p^2$ and $p^4$ being of slightly increased width. For some purposes, it will be realised that this last mentioned count may be considered a more realistic measurement than the high spot count of five shown in FIGURE 6*b*. It has been proposed, in a Schmitt trigger circuit, to provide a pair of ganged adjustable resistances respectively in the cathode leads $H^8$ and $H^9$ of the two valves H and $H^1$, whereby the minimum change in emplitude of the input signals giving rise to output pulses can be varied at will, i.e. the backlash voltage of the circuit can be varied. If desired, this proposal may be adopted in the present apparatus.

It is usually desirable, in testing surfaces for example to be used as bearings, not only to count the high spots or valleys but also to measure the bearing area at the various reference levels afforded by the setting of the biasing potentiometer $J^4$ for the trigger circuit $F^7$. In this way an indication is obtained, not only of the bearing area at the time of the testing, but also of how the bearing area will change with further preparation or with wear.

In connection with the measurement of bearing area it is to be understood that, when the input potential to the trigger circuit rises, due to the presence of a peak on the test surface, to give rise to the leading edge of an output pulse, the states of conducivity of the trigger circuit valves H and $H^1$ remain changed, before formation of the trailing edge of the output pulse, for a period dependent on the width, along the surface in the direction of traversing, of such surface peak. Thus the width or duration of the output pulse is proportional to the width of the surface peak, as can be seen from FIGURE 6*b*. Similarly, if output pulses of opposite phase are taken, the width or duration of each such pulse is proportional to the width of a surface trough. In addition however, since the surface peaks and troughs are of irregular shape, the measured width of such a peak or trough, and thus the width of the output pulse, depends on the reference level set by the biassing potentiometer for the trigger circuit. By summing the widths of the output pulses obtained from the trigger circuit throughout the range of traversing, a measure of the bearing area of the surface at the reference level, for example the centre line average above zero, is obtained. Thus, referring to FIGURE 6*b*, the sum of the widths of the pulses $p^1$, $p^2$ . . . $p^5$, relative to the length of the proportion of the traversing range in question, is a measure of the bearing area of the test surface. When the Schmitt trigger is set with a substantial backlash, resulting in the output shown in FIGURE 6*c*, a very slightly different measurement is obtained for the bearing area at the level $V_A$ set by the biassing potentiometer $J^4$, but for some purposes this slightly larger second measurement may be considered equally as realistic as the first measurement.

For the purpose of such bearing area measurement, the output pulses of the trigger circuit $F^7$, in addition to being fed to the counter $F^8$, are fed to a switching device $F^9$, conveniently a transistor switching device later described in detail. This transistor switching device $F^9$ is operated, in sympathy with the output pulses fed from the trigger circuit $F^7$, to open and close a point in a circuit leading from a constant-current source $F^{10}$ to the integrating meter $F^1$ to which the amplified profile-representative signals are fed during the preliminary traversing movement of the stylus $C^6$. During the repeat traversing movement of the stylus $C^6$, a second point in such connecting circuit is closed by switching means $G^3$. The current fed from the constant-current source $F^{10}$ is pre-adjusted so that, if the transistor switching device $F^9$ was closed throughout the repeat traversing movement, a full scale deflection would be obtained at the integrating meter $F^1$ at the end of such traversing movement. Such full scale deflection represents a bearing area of 100 percent, and would in fact be obtained in use if the biassing potentiometer $J^4$ was set to apply such a large negative bias that no operation of the trigger circuit $F^7$ occurred during the repeat traversing movement. Such a setting of the biassing potentiometer $J^4$ would be indicated at the scale of such potentiometer as a level many times the centre line average below zero, that is a level below the depth of the deepest troughs on the test surface. Clearly, at such level, the surface bearing area is 100 percent. Output pulses of opposite phase from the trigger circuit may be similarly utilised to obtain a measure of the bearing area of the surface troughs of an inverse replica of the surface actually requiring investigation.

FIGURE 7 is a circuit diagram comprising a pulse shaping unit $F^{11}$, the input $P_1$ to which is constituted by the output pulses of the Schmitt trigger, and also comprising the transistor switch $F^9$ and the constant-current source $F^{10}$. The meter $F^1$ is also shown. The pulse shaping circuit $F^{11}$ comprises a conventional squaring amplifier circuit incorporating two transistors N and $N^1$ together rendered conducting and non-conducting in accordance with the pulse input fed to the base of the first transistor N. The pulse output, consisting of pulses of improved shape and greater amplitude, is taken from the collector of the second transistor $N^1$, such output pulses being developed across the collector load $N^2$. The pulse output $P_o$, in addition to being fed to the counter $F^8$ (not shown in FIGURE 9), is fed through a resistance $P^1$ to the base of a transistor P constituting the operative element of the transistor switch $F^9$. Thus the collector of this transistor P is connected through the meter $F^1$ to the constant-current source $F^{10}$, and is only able to pass current, and thus permit current to flow through the meter $F^1$, when the potential on the base of such transistor P is altered, in relation to a fixed potential applied to the emitter, by the arrival of a pulse from the pulse shaping circuit $F^{11}$. The constant-current source $F^{10}$ comprises a transistor Q having a fixed biasing potential on its base and a related potential on its emitter determined by a variable resistance $Q^2$, which is preset, in the manner previously mentioned, so that if the transistor switch $F^9$ was transmitting throughout the repeat traversing movement of the stylus, the meter $F^1$ would indicate a bearing area of 100 percent. The collector of the transistor Q is connected through the meter $F^1$ to the transistor switch $F^9$. The potentials on the emitter of the transistor P and on the base of the transistor Q are determined by two zener diodes $P^2$ and $P^3$ and a fixed resistance $Q^1$ series connected as a potential divider between positive high tension and earth.

Thus, in use of the above-described arrangement, not only is a count obtained of the high spots above the reference level set by the biasing potentiometer $J^4$, but also obtained is a measure of the bearing area at such reference level. In general, a maximum high spot count and a bearing area in the region of 50 percent is to be expected when the biasing potentiometer $J^4$ is set to the zero value on its scale by means of the control element $J^5$, a lower high spot count and smaller percentage bearing area being obtained when the biassing potentiometer is set to say the centre line average above zero and a lower high spot count and a larger percentage bearing area (except in measurement of the bearing area of surface troughs) being obtained when the biassing potentiometer is set to say the centre line average below zero.

For completion of the understanding of the arrangement, the means will now be described whereby the two successive traversing movements of the stylus $C^6$, carried with the skid $C^4$ by the pick-up head $C^1$, are effected. These means are contained within the casing B through which slides the shaft C carrying the pick-up head $C^1$, as shown in FIGURE 2. Thus, the two successive traversing drives of the shaft C carrying the pick-up head $C^1$ are conveniently effected through an eccentric cam device K which in making one revolution causes one complete forward and backward movement of the shaft C through a roller $K^1$, spring loaded to maintain its engagement with the cam device K, and a transmission arm $K^2$. The cam device K is driven from a control disc $L^1$ through gearing $L^2$ having a 1:2 ratio, such control disc being in turn driven from an electric motor L. The control disc $L^1$ is provided with a detent notch $L^3$ for cooperation with a spring loaded starting lever $L^4$, which is associated also with a switch $L^5$ for starting and stopping the motor L. In addition, the control disc $L^1$ has a cam track, constituted by four arcuate portions $L^6$, $L^7$, $L^8$ and $L^9$, each extending over substantially 90 degrees. An element $L^{10}$ cooperating with such cam track acts to effect automatic operation of the electrical switches $G^1$, $G^2$, and $G^3$ previously mentioned, whereby such switches act to effect the appropriate connections and disconnections between the various units of the previously described electrical apparatus at the appropriate times in the overall duration of the two traversing drives.

Thus in use, the starting lever $L^4$ is operated to effect disengagement thereof from the detent notch $L^3$ in the control disc $L^1$ and also actuation of the switch $L^5$ controlling the motor L to effect starting thereof. The traverse having started, the element $L^{10}$ engages the first portion $L^6$ of the cam track, thereby causing the profile-representative signals to be fed to the integrating meter $F^1$ through the switches $G^2$ and $G^3$ with the switch $G^1$ connecting in circuit the fixed feed-back impedance $F^4$ of the signal amplifier $F^2$. While the element $L^{10}$ is in engagement with the second portion $L^7$ of the cam track, the pick-up head $C^1$ undergoes the return movement of the first traversing drive. During this return movement, the variable impedance $F^5$ is adjusted in the manner previously described. At the start of the second traversing drive, the element $L^{10}$ engages the third portion $L^8$ of the cam track, thereby causing the profile-representative signals to be fed to the trigger circuit $F^7$ through the switch $G^2$ with the switch $G^1$ connecting in circuit the adjusted variable impedance $F^5$ for the amplifier $F^2$, and further causing the output from the constant-current source $F^{10}$ via the transistor switch $F^9$ to be fed to the meter $F^1$ through the switch $G^3$. During the return movement of the second traversing drive, the element $L^{10}$ engages the fourth portion $L^9$ of the cam track. At the end of the second return stroke, the starting lever $L^4$ re-engages the detent notch $L^3$ in the control disc $L^1$, thereby operating the switch $L^5$ controlling the motor L to effect stopping thereof. The engagement of the element $L^{10}$ with the portions $L^7$ and $L^9$ of the cam track, during the two return movements of the pick-up head $C^1$, may conveniently by means of further switches (not shown) effect disconnection of the signal amplifier $F^2$ from the carrier amplifier and demodulator $E^1$ and also retraction of the stylus $C^6$ from the test surface $D^1$, for example by means of a small solenoid (not shown) in the pick-up head $C^1$. Switching means not shown, but consisting for example of a cam mounted on the shaft C within the casing B for cooperation with a second switching element, may also be provided to shunt the two sides of the integrating meter $F^1$ at the beginning of each of the two traversing drives, thereby to discharge and reset such meter in readiness more particularly for the bearing area measurement to be obtained during the second traversing drive following the average value measurement obtained during the preliminary traversing drive.

For some purposes, it is useful in effecting a high spot or valley count to exclude from such count those output pulses of the trigger circuit $F^7$ whose durations do not exceed a preselected duration. For obtaining such modified count, it is convenient to employ a pulse-width discriminator which may be optionally connected between the trigger circuit $F^7$ and the pulse counter $F^8$. A convenient adjustable pulse-width discriminator which has been found useful for the purpose in question forms the subject of F. N. Taylor's copending United States patent application Serial No. 376,919, and is shown in block diagram in FIGURE 8. Such pulse width discriminator $F^{12}$ essentially comprises a transistor switch M, a monostable circuit R with gated input and output, and an output gate circuit in the form of a so-called "and" gate S. The natural time delay of the monostable circuit is adjustable to permit variation of the minimum width of pulse transmitted by the pulse width discriminator. The circuit diagram of the pulse width discriminator is shown in detail in FIGURE 9. For the purpose of describing such pulse-width discriminator, it will be assumed that the input to such pulse width discriminator from the Schmitt trigger consists of a series of substantially square waveform pulses of negative polarity (if necessary obtained by first feeding the output of the Schmitt trigger through an inverter) corresponding to the peaks or troughs on the test surface.

The switching circuit M comprises two transistors $M^1$ and $M^2$ the first of which has its emitter connected to earth and its collector connected through a load resistance $M^3$ to positive high tension. The input signal is applied through an input resistance $M^4$ to the base of this first transistor $M^1$, such transistor base being connected to earth through a semi-conductor diode $M^5$. The output of the first transistor $M^1$ is applied to the base of the second transistor $M^2$ through a coupling $M^6$ consisting of a resistance and capacitance in parallel, the emitter of such second transistor being connected to positive high tension and the collector of such second transistor being connected through a resistance $M^7$ to earth. Before the arrival of a negative pulse, the first transistor $M^1$ is conducting and the second transistor $M^2$ is substantially non-conducting. These conditions are reversed during the period of a negative input pulse.

The above-described switching circuit has two output points, one at the collector of the first transistor $M^1$ and the other at the collector of the second transistor $M^2$. A negative input pulse gives rise to a positive output pulse of unchanged duration at the first output point and a negative output pulse of unchanged duration at the second output point.

The negative output pulse of the switching circuit is fed directly to the first of two input points of the "and" gate S. Such "and" gate comprises a transistor $S^1$ whose emitter is connected to positive high tension and whose base is biassed relative to positive high tension by means of a resistance $S^2$. The negative output pulse of the switching circuit M is applied through a resistance $S^3$ to the collector of the transistor $S^1$, which constitutes the output point of the "and" gate, and to the base of the transistor through a resistance $S^4$ is applied a negative pulse of predetermined duration obtained from a monostable circuit.

The monostable circuit R comprises two transistors $R^1$ and $R^2$ the collectors of which are each connected to positive high tension through a resistance and the emitters of which are connected together and through a load resistance $R^3$ to earth. The collector of the transistor $R^1$ has an electrical connection to the base of the transistor $R^2$ and the collector of the transistor $R^2$ has an electrical connection to the base of the transistor $R^1$. With this arrangement, a change in state of the first transistor $R^1$, which is normally conducting, causes a change in state of the second transistor $R^2$, which is normally substantially non-conducting. The negative output pulse of the switching circuit M, in addition to being fed to the "and" gate S, is used to trigger the monostable circuit R to cause the first transistor $R^1$ to change its state. For this purpose, such negative pulse is applied through a coupling capacitor $R^4$, an input gate $R^5$, a capacitor $R^6$ associated with a time delay and a semiconductor diode $R^7$ to the base of such transistor $R^1$. The monostable input gate $R^5$ consists of a shunt connection to positive high tension through a semi-conductor diode of appropriate polarity, and a semi-conductor diode of the opposite polarity in series with the coupling capacitance $R^4$. The timing capacitor $R^6$ has a shunt connection to positive high tension through a variable resistance $R^8$. Such capacitance $R^6$ and variable resistance $R^8$ provide a time delay, whereby, when the monostable circuit is triggered to cause a change of state of the first and thence the second of the two transistors $R^1$ and $R^2$, such first and thence such second transistors return to their original state after a predetermined time period determined by the setting of the variable resistance $R^8$. The monostable circuit is triggered by the leading edge of the negative pulse applied to the base of the first transistor $R^1$ and thereby gives rise to the leading edge of a negative output pulse at an output point constituted by the emitter, having a load $R^{10}$, of an emitter follower $R^9$ connected between the collector of the second transistor $R^2$ and the timing capacitor $R^6$, a shunt in the form of a semi-conductor diode $R^{11}$ providing the path for the input pulse. After the predetermined time delay, the two transistors $R^1$ and $R^2$ naturally revert to their original state, thereby giving rise to the trailing edge of the positive output pulse at the emitter of the emitter follower $R^9$.

With the arrangement of monostable circuit above described the trailing edge of the negative output pulse of the switching circuit M does not cause such monostable circuit R to revert prematurely to its original state if the duration of such switching circuit output pulse is less than the predetermined time delay, nor is it possible satisfactorily to utilise the leading and trailing edges of a single pulse to trigger a monostable circuit in opposite directions. Instead, in the event of the switching circuit pulse duration being less than the predetermined time delay, the trailing edge of the positive output pulse from the switching circuit is utilised. Thus, the first output point of the switching circuit is connected through a second coupling capacitor $R^{12}$, second input gate $R^{13}$, comprising the same elements as the first of such input gates, a capacitance-resistance coupling $R^{14}$ and a further diode $R^{15}$, to the base of the second transistor $R^2$ of the monostable circuit. A resistance $R^{16}$ is provided between the coupling $R^{14}$ and earth. The provision of means for prematurely causing the monostable circuit R to revert to its original condition when the pulse from the switching circuit is of width less than the predetermined pulse width of such monostable circuit ensures that such circuit is prepared for the second of two closely following pulses from the switching circuit.

With the above-described arrangement, a negative pulse is obtained at the output of the "and" gate S only when the negative pulse from the switching circuit M is of duration longer than that of the negative pulse from the monostable circuit R. The latter duration is predetermined by the setting of the variable resistance $R^8$.

FIGURES 10*a*, 10*b*, and 10*c* respectively show, in corresponding phase relationship, a negative input pulse $V^1$ arriving at one input point of the "and" gate from the switching circuit and of duration greater than the natural pulse width of the monostable circuit, a negative input pulse $V^2$, of duration equal to the monostable pulse width, arriving at the other input point of the "and" gate, and the negative output pulse $V^3$ of reduced width resulting from such two input pulses.

Similarly, FIGURES 11*a*, 11*b* and 11*c* respectively show, in corresponding phase relationship, a negative input pulse $V^1$ arriving at one input point of the "and" gate from the switching circuit and of duration less than the natural pulse width of the monostable circuit, and a negative input pulse $V^2$ of the same duration (since in this case the monostable circuit is triggered prematurely back to its original condition) arriving at the other input point of the "and" gate. In this instance the output $V^3$ of the "and" gate remains constant and no output pulse is produced.

With further regard to the above-described apparatus, it may be mentioned that means are often provided whereby traversing may be effected throughout either one of alternative ranges along the test surface. For this reason especially, it may be preferred for the counter to give an indication of the number of high spots or valleys per inch rather than an absolute measure of the number of high spots or valleys in the particular traversing range employed. For this purpose (see FIGURE 12) the output pulses of the trigger circuit $F^7$ (or the pulse shaping circuit or the pulse width discriminator) are fed to a monostable circuit $F^{13}$ having a short adjustable time delay. Associated with such monostable circuit is a gate circuit $F^{14}$ continuously fed from an oscillator $F^{15}$. Normally such gate circuit $F^{14}$ is closed and provides no output, but when an output pulse from the trigger circuit $F^7$ operates the monostable circuit $F^{13}$, such gate circuit is opened to permit the oscillator signals to be fed to the electrical counter $F^8$. The gate circuit $F^{14}$ is closed on natural reversion of the monostable circuit $F^{13}$ to its stable condition at the end of its short time delay.

As shown in FIGURE 12, the monostable circuit $F^{13}$ comprises two transistors $T^1$ and $T^2$ conventionally arranged in opposite states of conductivity. The circuit is triggered by the leading edge of a pulse from the trigger circuit $F^7$ applied to the base of the transistor $T^1$ through a gate in the form of a series connected diode $T^3$ and a shunt connected diode $T^4$. The circuit naturally reverts to its original state at the end of a time delay determined by the capacitance $T^5$ and resistance $T^6$. The resistance $T^6$ is adjustable to permit adjustment of the time delay, although this may alternatively be effected by making variable the capacitance $T^5$. Even when of maximum duration, the time delay of the monostable circuit is sufficiently short to ensure that such circuit will always have reverted to its original state in time to be re-triggered by the second of two closely following pulses from the trigger circuit $F^7$. The output of the trigger circuit, taken across a load $T^7$ on the collector of the first transistor $T^1$ thus consists of pulses each of the same duration, one for each pulse in the output of the trigger circuit $F^7$. These equi-width pulses are fed to one input point of the gate circuit $F^{14}$, to the other input point of which is fed the pulse output of the oscillator $F^{15}$. The gate circuit $F^{14}$ comprises two diodes $U^1$ and $U^2$ whose cathodes are connected together and through a resistance U to negative high tension. The two input points of the circuit are constituted by the anodes of such two diodes $U^1$ and $U^2$. The amplitudes of the two inputs to the gate circuit are arranged to be the same and of the same potential levels. Thus, if the normal potential level on the anode of the first diode $U^1$ is $V_L$, and during the duration of a pulse from the monostable circuit $F^{13}$ such potential drops to zero, the oscillator $F^{15}$ is arranged to give a pulse output oscillating between the levels zero and $V_L$, this pulse output being applied to the anode of the second diode $U^2$. With this arrangement, the first diode $U^1$ is always conducting, so that the potential on the cathode of the second diode $U^2$ rises and falls between zero and $V_L$ in accordance with the pulse output of the monostable circuit. However, the second diode $U^2$ only conducts, to give an output fed to the counter $F^8$, when its cathode potential is zero and its anode potential rises to $V_L$ due to the arrival of a pulse from the oscillator $F^{15}$. Thus, the second diode $U^2$ passes to the counter $F^8$ only those oscillator pulses which arrive at its anode while a pulse from the monostable circuit $F^{13}$, corresponding to a pulse from the trigger circuit $F^7$, is being applied to the first diode $U^1$. Thus, for each pulse originating from the trigger circuit $F^7$, the counter $F^3$ receives that number of pulses from the oscillator $F^{15}$ which are generated during the time delay of the monostable circuit $F^{13}$. Assuming for example that the range of traversing selected is 0.2 of an inch, it is required for the counter to indicate five times the actual number of output pulses from the trigger circuit. Such a count is achieved by adjusting the time delay of the monostable circuit $F^{13}$ to be five times the period of the oscillator $F^{15}$, so that the gate circuit $F^{14}$ is opened for the period of such time delay to permit five oscillations or pulses to be fed to the counter $F^8$. Alternatively for example, as shown in FIGURES 13*a*, 13*b* and 13*c* for a traversing range of 0.1 of an inch, the time delay of the monostable circuit is adjusted so that, for each output pulse $V_X$ of the monostable circuit, the gate circuit is opened for a period such that, due to the continuous pulse output $V_Y$ of the oscillator, an output $V_Z$ containing ten oscillations is fed to the counter. It will be appreciated that, instead of providing the monostable circuit $F^{13}$ with an adjustable time delay, such circuit may have a fixed short time delay and means may be provided for adjusting the frequency of the oscillator $F^{15}$ to suit the selected traversing range.

In a modification of the above described arrangement shown in FIGURE 14 the amplifier $F^2$ with adjustable feed-back is replaced by an amplifying device $F^{16}$ the gain of which can be adjusted by varying a control potential at a control point of such device. The meter $F^1$ is replaced by electrical receiving means $F^{17}$ in the form of means for storing an electrical charge representative of the value of a characteristic magnitude of the amplified profile-representative signals which are fed to such receiving means during the preliminary traversing movement of the stylus through a switch $G^4$. During the second or repeat traversing movement of the stylus, the receiving means $F^{17}$ is connected to the control point of the amplifying device $F^{16}$ through a switch $G^5$, to adjust the control potential automatically in accordance with the magnitude of the stored charge, so that the profile-representative signals, which are now fed to the trigger circuit $F^7$ through the switch $G^4$, are amplified at the gain required for the said characteristic magnitude to correspond to the required pre-selected value. References used in FIGURE 14 and not specifically referred to above are used to denote the same electrical parts as in FIGURE 3.

A practical form of the above described modification is shown in FIGURE 15. The amplifying device $F^{16}$ is constituted by a variable-mu valve V. The profile-representative signals are applied, during both the preliminary and second traversing movements of the stylus, to the control grid of such valve V, which also constitutes the point of the circuit to which the adjusted control potential is applied during the second traversing movement of the stylus. The output of the amplifying device is taken from the anode of the valve V to the switch $G^4$, whereby the profile-representative signals are fed during the preliminary traversing movement of the stylus to a push-pull amplifier W. The positive and negative outputs of the push-pull amplifier are respectively rectified by diodes $W^1$ and $W^2$ and the combined rectified output is fed to an integrating amplifier $W^3$, of a conventional kind incorporating an integrating capacitance $W^5$ with an associated resistance $W^4$. During such preliminary traversing movement of the stylus, the switch $G^5$ connects the grid leak $V^1$ of the valve V to earth and the output point of the integrating amplifier $W^3$ is on open circuit. Thus, in use, due to the polarity of the diodes $W^1$ and $W^2$, a negative charge builds up on the integrating capacitor $W^5$ in accordance with the mean rectified level (centre line average value) of the profile-representative signals generated during the preliminary traversing movement of the stylus. During the repeat traversing movement of the stylus, the negative charge on the integrating capacitor $W^5$ is applied to the control grid of the variable-mu valve V through the switch $G^5$ and a high resistance $V^1$ so that the profile-representative signals are now amplified at a reduced gain such that the centre line average value of the amplified signals corresponds to the pre-selected value. During such repeat traversing movement of the stylus, the switch $G^4$ causes the amplified profile-representative signals at the adjusted gain to be fed to the trigger circuit $F^7$. With the above-described arrangement, the magnitude of the change in control potential at the control grid of the valve V, from the preliminary to the repeat traversing movement of the stylus, is clearly dependent on the magnitude of the charge stored on the integrating capacitor $W^5$ during the preliminary traversing movement of the stylus, the magnitude of this stored charge being in turn dependent on the centre line average value of the profile-representative signals arising during such preliminary traversing movement. Thus, in order to ensure that the required gain adjustment takes place, it is only necessary appropriately to select the values of the integrating capacitor $W^5$ and its associated resistance $W^4$ in relation to the portion of the gain characteristic of the variable-mu valve V which is in use. The portion of this gain characteristic which is in use is determined by appropriate selection of the cathode resistance $V^2$, since the value of this resistance determines the effective control potential on the control grid of the valve V during the preliminary traversing movement of the stylus. In the last-described arrangement having automatic gain control, an output may be taken from the receiving means during the preliminary traversing movement of the stylus to be fed to a meter to obtain a measurement of the centre line average of the surface profile, if desired. The switches $G^4$ and $G^5$, and also a discharge switch $G^6$ for the integrating capacitor $W^5$, are automatically operated from a cam switching element operated in synchronism with the traversing movement of the pick-up head, as previously described with reference to FIGURE 2 in connection with the switches provided in the arrangement having manual gain adjustment.

Various modifications of the above-described apparatus are possible within the scope of the invention. Thus, in the arrangement provided with manual gain adjustment, it is to be realised that the meter used to receive the amplified profile-representative signals during the preliminary traversing movement of the stylus may be arranged to indicate the value of any convenient characteristic magnitude of the test surface other than the centre line average. It is not even essential for such meter to be an integrating meter, but may be for example a peak meter indicating the height of the highest surface peak. In this case the biassing potentiometer or other actuating-level adjusting means for the Schmitt trigger or other trigger circuit will preferably be calibrated in terms of the maximum peak height, the gain adjusting means for the signal amplifier always being set so that during the repeat traversing movement the profile-representative signals are amplified at a gain such that the value of the peak signal corresponds to a predetermined value. In this instance, it will be clear that for measurement of bearing area a separate meter of the integrating kind is employed. Such meter may if desired be fed directly by the output pulses of the trigger circuit instead of from a constant-current source through a switching device controlled by such trigger circuit output pulses. With the arrangement having manual gain control particularly, it is not necessary for the two traversing movements to be effected automatically. If preferred, the traversing means may act only to effect a single stroke on operation of a starting button, the pick-up subsequently being returned manually to its starting position and the starting button being re-operated to effect the second traversing movement after adjusting the amplifier gain and manually operating the various electrical switches.

In the arrangement having automatic gain control also, the receiving means may be responsive, during the preliminary traversing movement of the stylus, to a characteristic magnitude of the profile-representing signals other than the centre line average. For example, by taking only the positive output of the push-pull amplifier and feeding such output to a capacitance having a cathode follower, a charge representative of the height of the highest surface peak may be stored on the capacitor of a following integrating circuit, whereby the gain of the variable-mu valve is subsequently automatically adjusted in accordance with the value of this characteristic magnitude. The adjustable gain device for automatic gain control may also be constituted by means other than a variable-mu valve circuit. For example a circuit in the form of a Hall multiplier may be employed, the electrical charge stored during the preliminary traversing movement of the stylus being automatically utilised, during the second traversing movement, to set the gain of the multiplier to the required level by generating an electromagnetic field of appropriate strength around such multiplier. Yet again, the charge stored during the preliminary traversing movement may be automatically utilised, before the second traversing movement is effected, to operate an amplifying servo-device which effects the required adjustment of an amplifier gain control, for example a variable feed back impedance.

In connection with the Schmitt trigger, it will be appreciated that the circuit incorporating two valves may be replaced by an analogous transistor circuit.

Finally, it should be made clear that the invention is not limited to the provision in surface investigating apparatus of means both for counting high spots and for indicating bearing area, and that if desired the apparatus may be arranged to provide for only one such measurement.

What I claim as my invention and desire to secure by Letters Patent is:

1. In apparatus for investigating surface texture having a stylus for engagement with the surface under test, means for traversing the stylus along the test surface and means for generating amplified electrical signals representative of the profile of the test surface in accordance with the working movements of the stylus approximately normal to the test surface during traversing, means for the investigation of surface high spots or valleys, comprising means for receiving the amplified profile-representative signals during a preliminary traversing movement of the stylus, an adjustable gain device which is operated, in preparation for a second traversing movement of the stylus along the test surface, in accordance with the value of a characteristic magnitude of the amplified profile-representative signals fed to the receiving means during the preliminary traversing movement, so that the profile-representative signals generated during such second traversing movement are amplified at a gain such that the value of the said characteristic magnitude corresponds to a pre-selected value, a trigger circuit for receiving the amplified profile-representative signals at the adjusted gain during the second traversing movement of the stylus, means for adjusting the level at which the trigger circuit is actuated, whereby only selected of the amplified profile-representative signals give rise to output pulses from the trigger circuit, and means fed with the output pulses of the trigger circuit for providing a measurement or indication relating to surface high spots or valleys in accordance with the setting of the level-actuating adjusting means.

2. Apparatus for investigating surface texture as claimed in claim 1, including connecting means between the receiving means and the adjustable gain device whereby the receiving means acts to effect adjustment of the adjustable gain device automatically in accordance with the value of the characteristic magnitude of the amplified profile-representative signals fed to such receiving means during the preliminary traversing movement of the stylus.

3. Apparatus for investigating surface texture as claimed in claim 2, in which the adjustable gain device comprises a variable gain amplifying circuit having a control point at which variation in a control potential causes the required gain adjustment, the control potential at such control point during the second traversing movement of the stylus being determined by the value of the characteristic magnitude of the profile-representative signals fed to the receiving means during the preliminary traversing movement of the stylus.

4. Apparatus for investigating surface texture as claimed in claim 3, in which the receiving means comprises means for storing an electrical charge representing the value of the characteristic magnitude of the profile-representative signals fed to such receiving means during the preliminary traversing movement of the stylus, the potential created by such charge being applied to the control point of the variable gain amplifying circuit to cause the profile-representative signals generated during the second traversing movement of the stylus to be amplified at the required gain.

5. Apparatus for investigating surface texture as claimed in claim 4, in which the receiving means includes an integrating circuit providing an output indicative of a mean or average value of the amplified profile-representative signals fed to such receiving means during the preliminary traversing movement of the stylus, whereby, by adjustment of the gain of the amplifying means, the mean or average value of the amplified profile-representative signals fed to the trigger circuit during the second traversing movement of the stylus is caused to correspond to the pre-selected value.

6. Apparatus for investigating surface texture as claimed in claim 5, in which the output of the trigger circuit is fed to an electrical pulse counter, thereby providing a count of surface high spots or valleys in accordance with the setting of the level-actuating adjusting means.

7. Apparatus for investigating surface texture as claimed in claim 6, in which the output pulses of the trigger circuit are utilised to operate integrating means providing an output indication of the sum of the widths of the selected pulses, thereby providing a measurement of the bearing area of surface high spots or valleys in accordance with the setting of the level-actuating adjusting means.

8. Apparatus for investigating surface texture as claimed in claim 7, including means for automatically effecting the two traversing movements of the stylus, each along the same path along the test surface, including means for returning one stylus to its starting position after completion of the preliminary traversing movement.

9. Apparatus for investigating surface texture as claimed in claim 8, in which the output pulses of the trigger circuit are fed to the counter through a pulse-width discriminator transmitting only those of the output pulses whose duration exceeds a particular minimum value.

10. Apparatus for investigating surface texture as claimed in claim 1, in which the level-actuating adjustment means incorporates a scale calibrated in terms of the said characteristic magnitude.

11. Apparatus for investigating surface texture as claimed in claim 1, in which the receiving means includes an integrating circuit providing an output indicative of a mean or average value of the amplified profile-representative signals fed to such receiving means during the preliminary traversing movement of the stylus, whereby, by adjustment of the gain of the amplifying means, the mean or average value of the amplified profile-representative signals fed to the trigger circuit during the second traversing movement of the stylus is caused to correspond to the pre-selected value.

12. Apparatus for investigating surface texture as claimed in claim 1, in which the trigger circuit comprises a Schmitt trigger employing two valves with a common cathode load, the amplified profile-representative signals at the adjusted gain being fed to the control grid of the first valve, which is biassed at a level determined by the actuating-level adjusting means so as normally to be in one of two opposite states of conductivity, and the pulse output of the first valve being taken from the anode to the control grid of the second valve, which is biassed so as normally to be in the state of conductivity opposite to the normal state of conductivity of the first valve, thereby to give rise to output pulses of substantially square waveform at the anode of such second valve.

13. Apparatus for investigating surface texture as claimed in claim 1, in which the trigger circuit comprises a Schmitt trigger employing two transistors with a common emitter load, the amplified profile-representative signals at the adjusted gain being fed to the base of the first transistor which is biassed at the level determined by the actuating-level adjusting means so as normally to be in one of two opposite states of conductivity, and the pulse output of the first transistor being taken from the collector to the base of the second transistor, which is biassed so as normally to be in the state of conductivity opposite to the normal state of conductivity of the first transistor, thereby to give rise to output pulses of substantially square waveform at the collector of such second transistor.

14. Apparatus for investigating surface texture as claimed in claim 1, in which the trigger circuit has associated with it an input circuit of high input impedance and low output impedance and comprising a valve or transistor biassed on the control grid or base by means of a variable resistance constituting the actuating-level adjusting means, the amplified profile-representative signals at the adjusted gain being applied to the control grid of such valve or base of such transistor and the output of such valve or transistor being taken directly to the trigger circuit.

15. In apparatus for investigating surface texture having a stylus for engagement with the surface under test, means for traversing the stylus along the test surface and means for generating amplified electrical signals representative of the profile of the test surface in accordance with the working movements of the stylus approximately normal to the test surface during traversing, means for the investigation of surface high spots and valleys, comprising an electrical meter affording an indication of the value of a characteristic magnitude of the amplified profile-representative signals fed to such meter during a preliminary traversing movement of the stylus, an adjustable gain device, a manual control for effecting adjustment of the adjustable gain device, such manual control being associated with a scale calibrated in terms of a corresponding scale on the meter, whereby by operation of such manual control in accordance with the indication obtained during the preliminary traversing movement, the profile-representative signals generated during a second traversing movement of the stylus are amplified at a gain such that the value of the said characteristic magnitude corresponds to a pre-selected value, a trigger circuit for receiving the amplified profile-representative signals at the adjusted gain during the second traversing movement of the stylus, means for adjusting the level at which the trigger circuit is actuated, whereby only selected of the amplified profile-representative signals give rise to output pulses from the trigger circuit, and means fed with the output pulses of the trigger circuit for providing a measurement or indication relating to surface high spots or valleys in accordance with the setting of the level-actuating adjusting means.

16. Apparatus for investigating surface texture as claimed in claim 15, in which the receiving means includes an integrating circuit providing an output indicative of a mean or average value of the amplified profile-representative signals fed to such receiving means during the preliminary traversing movement of the stylus, whereby, by adjustment of the gain of the amplifying means, the mean or average value of the amplified profile-representative signals fed to the trigger circuit during the second traversing movement of the stylus is caused to correspond to the pre-selected value.

17. Apparatus for investigating surface texture as claimed in claim 16 in which the output pulses of the trigger circuit are fed to an electrical counter through a pulse-width discriminator which is adjustable to permit pre-selection of the minimum width of pulse to be transmitted.

18. Apparatus for investigating surface texture as claimed in claim 17, in which the output pulses of the trigger circuit are utilised to operate integrating means providing an output indication of the sum of the widths of the selected pulses, thereby providing a measurement of the bearing area of the surface high spots or valleys in accordance with the setting of the level-actuating adjusting means.

19. Apparatus for investigating surface texture as claimed in claim 18, in which the adjustable gain device comprises an amplifier having a feed-back circuit incorporating a variable impedance.

20. Apparatus for investigating surface texture as claimed in claim 15, in which the level-actuating adjustment means incorporates a scale calibrated in terms of the said characteristic magnitude.

21. Apparatus for investigating surface texture as claimed in claim 15, including means for automatically effecting the two traversing movements of the stylus, each along the same path along the test surface, including means for returning the stylus to its starting position after completion of the preliminary traversing movement.

22. In apparatus for investigating surface texture having a stylus for engagement with the surface under test, means for traversing the stylus along the test surface and means for generating amplified electrical signals representative of the profile of the test surface in accordance with the working movements of the stylus approximately normal to the test surface during traversing, means for the investigation of surface high spots or valleys, comprising means for receiving the amplified profile-representative signals during a preliminary traversing movement of the stylus, an adjustable gain device which is operated, in preparation for a second traversing movement of the stylus along the test surface, in accordance with the value of a characteristic magnitude of the amplified profile-representative signals fed to the receiving means during the preliminary traversing movement, so that the profile-representative signals generated during such second traversing movement are amplified at a gain such that the value of the said characteristic magnitude corresponds to a pre-selected value, a trigger circuit for receiving the amplified profile-representative signals at the adjusted gain during the second traversing movement of the stylus, means for adjusting the level at which the trigger circuit is actuated, whereby only selected of the amplified profile-representative signals give rise to output pulses from the trigger circuit, and integrating means fed with the output of the trigger circuit and providing an output indication of the sum of the widths of the selected pulses, thereby providing a measurement of the bearing area of surface high spots or valleys in accordance with the setting of the level-actuating adjusting means.

23. Apparatus for investigating surface texture as claimed in claim 22, in which the integrating means is fed from a constant-current source through a switching device for a time dependent on the durations of the output pulses of the trigger circuit.

24. Apparatus for investigating surface texture as claimed in claim 23, in which the constant-current source is pre-adjusted to give a pre-selected output from the integrating means with the switching device transmitting throughout the duration of the second traversing movement of the stylus.

25. Apparatus for investigating surface texture as claimed in claim 24, in which the receiving means includes an integrating circuit providing an output indicative of a mean or average value of the amplified profile-representative signals fed to such receiving means during the preliminary traversing movement of the stylus, whereby, by adjustment of the gain of the amplifying means, the mean or average value of the amplified profile-representative signals fed to the trigger circuit during the second traversing movement of the stylus is caused to correspond to the pre-selected value.

26. Apparatus for investigating surface texture as claimed in claim 25, in which the integrating means is constituted by the integrating circuit to which the amplified profile-representative signals are fed during the preliminary traversing movement.

27. Apparatus for investigating surface texture as claimed in claim 22, in which the receiving means is constituted by an electrical meter affording an indication of the value of the characteristic magnitude of the amplified profile-representative signals fed to such receiving means during the preliminary traversing movement of the stylus, and the adjustable gain device is operable by means of a hand control associated with a scale calibrated in terms of a corresponding scale on such meter.

28. Apparatus for investigating surface texture as claimed in claim 22, including means for automatically effecting the two traversing movements of the stylus, each along the same path along the test surface, including means for returning the stylus to its starting position after completion of the preliminary traversing movement.

References Cited by the Examiner

UNITED STATES PATENTS 3,123,999 3/1964 Judd ---------------- 73—105

OTHER REFERENCES

German application, P 9,654, March 1956.

RICHARD C. QUEISSER, *Primary Examiner.*

J. J. GILL, *Assistant Examiner.*